United States Patent [19]
Lengyel

[11] Patent Number: 6,042,241
[45] Date of Patent: Mar. 28, 2000

[54] BACKLIGHT WITH INTEGRAL ILLUMINATION SOURCE

[75] Inventor: J. Michael Lengyel, Ramona, Calif.

[73] Assignee: Litton Systems, Inc., Woodland Hills, Calif.

[21] Appl. No.: 09/035,199

[22] Filed: Mar. 5, 1998

Related U.S. Application Data

[60] Provisional application No. 60/054,347, Jul. 31, 1997.

[51] Int. Cl.[7] .............................. F21V 21/00; F21V 17/00
[52] U.S. Cl. ........................... 362/84; 362/551; 362/559; 362/560; 362/561; 362/582
[58] Field of Search .............................. 362/84, 559, 551, 362/560, 582, 561

[56] References Cited

U.S. PATENT DOCUMENTS

| | | | |
|---|---|---|---|
| 2,644,113 | 5/1953 | Etzkorn | 362/84 |
| 5,146,354 | 9/1992 | Plesinger . | |
| 5,202,950 | 4/1993 | Arego et al. | 385/146 |
| 5,211,467 | 5/1993 | Seder | 362/84 |
| 5,359,691 | 10/1994 | Tai et al. | 385/146 |
| 5,664,862 | 9/1997 | Redmond et al. . | |

FOREIGN PATENT DOCUMENTS

| | | |
|---|---|---|
| 0 751 340 A2 | 1/1997 | European Pat. Off. . |
| 2052166 | 4/1971 | France . |

*Primary Examiner*—Sandra O'Shea
*Assistant Examiner*—Bertrand Zeade
*Attorney, Agent, or Firm*—Price, Gess & Ubell

[57] ABSTRACT

A backlight assembly for liquid crystal displays uses a clear sheet of plastic or UV friendly resin as a light-pipe and has one or more fluorescent lamps located in a cavity along an edge of the sheet. The cavity is coated with photo-luminescent phosphor. A quartz ultra-violet lamp inside the cavity is filled with Argon gas and a small amount of mercury to excite the phosphor coated cavity to fluoresce. The light energy generated is throughout the light-pipe, thereby providing much brighter displays than possible with prior art light-pipe backlight assemblies.

21 Claims, 4 Drawing Sheets

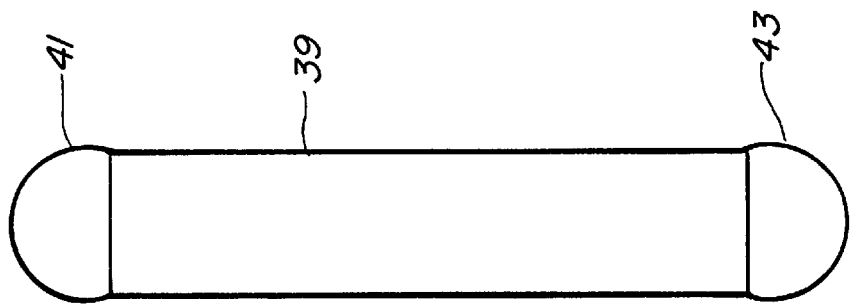
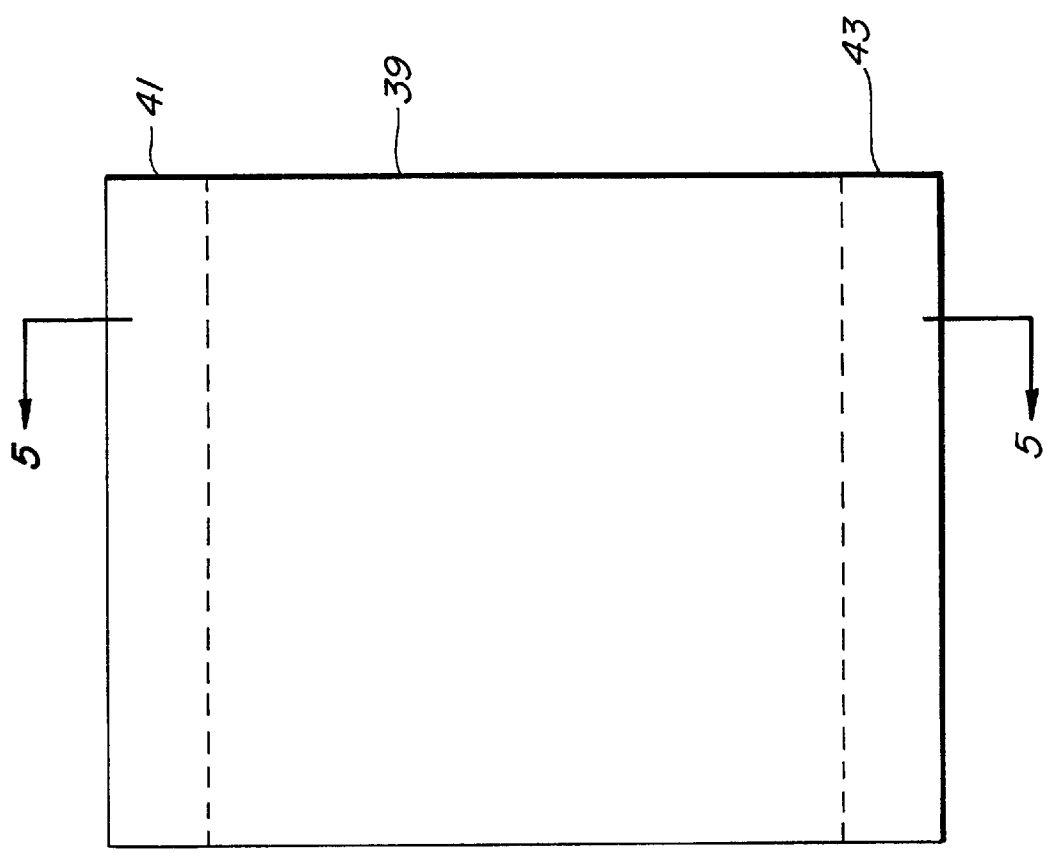

BACKLIGHT WITH INTEGRAL ILLUMINATION SOURCE

This application claims benefit of provisional application No. 60/054,347, filed Jul. 31, 1997.

BACKGROUND OF THE INVENTION

1. Field of the Invention

The present invention relates generally to improvements in back-lit liquid crystal displays and more particularly pertains to a new and improved backlight assembly for liquid crystal displays.

2. Description of Related Art

It is desirable that laptop and smaller portable personal computers be as lightweight, robust and readily portable as possible. In the attempt to satisfy these design constraints, flat panel liquid crystal displays have become a standard for such devices. These flat panel displays utilize a matrix array of liquid crystal picture elements or pixels arranged in a plurality of rows and columns. Typically, a liquid crystal display may be either reflective or transmissive. A reflective liquid crystal display is one which depends upon ambient light conditions in order to be viewed, in other words, light from the surrounding environment incident upon the side of the display facing the viewer. Transmissive liquid crystal displays use an illuminating means, such as a lamp array, operatively disposed on a side of the matrix array of picture elements opposite the viewer. This illumination means or backlight typically also includes a back reflector adapted to redirect any stray illumination towards the matrix array of picture elements. The purpose of the backlight is to ensure that the displaying image is as bright as possible.

All transmissive liquid crystal displays operate as light modulators, in that the displays themselves do not emit light. These liquid crystal displays rely upon backlighting to provide the light necessary for reading. One such back-lit display, or active matrix liquid crystal display, uses a twisted nematic liquid crystal material and two polarizers as the optical components in the modulating mechanism. These materials, together with the color filters, result in a color display panel which can, because of the nature of its construction, only transmit about five percent of the radiation directed thereupon. Consequently, a bright backlight is necessary in order for full color displays to be clearly readable in bright ambient environments.

All backlighting assemblies (FIG. 1) designed for active matrix liquid crystal display applications have the same basic components. More specifically, each backlighting assembly 11 includes at least a light source 12, an optical system 14 comprising of one or more lenses for altering the nature of the light emitting from the light source 12, a diffuser 15 and a display element 16 comprising a plurality of rows and columns of liquid crystal picture elements adapted to be illuminated by the light source 12. A back reflector 13 is utilized to redirect light from the light source 12 so that the maximum amount of light is directed towards the display element 16. The diffuser 15 is provided to scatter the collimated light so that it will illuminate the display element 16 in all directions and provide acceptable wide angle viewing. The light source 12 illustrated in FIG. 1 does not generate a uniform light output. The optical lens element 14 and the diffuser 15 redistribute the intensity of radiation from high intensity areas to lower intensity areas to provide acceptable uniformity across the viewing surface of the liquid crystal display.

The characteristics which are most important in the design of optimized back lighting assemblies include (1) uniformity of illumination across a large surface area; (2) high brightness for producing a sharp readily readable image; (3) a low profile that can be easily disposed for viewing; (4) the overall design of the backlight taking into consideration the number, configuration and redundancy of lamps; (5) the heat effect caused by the number, configuration and redundancy of lamps; and (6) the total power consumed by the lighting scheme, an extremely important consideration in handheld or portable displays.

A number of different backlight configurations, all which include a plurality of discreet optical components disposed between the plane of the source of backlight radiation and the plane of the matrix array of liquid crystal picture elements, have been designed in an effort to maximize the desirable characteristics listed above. For example, liquid crystal backlighting devices have used light diffusers to achieve a more uniform distribution of projected light across the entire viewing surface of the liquid crystal display.

A second technique which is employed to enhance the quality of a backlight is to operatively dispose a light collimating lens such as a fresnel lens between the source of the backlight and the matrix array of liquid crystal picture elements. Other efforts to achieve the advantage of both light collimation and light diffusion have resulted in incorporating both a discreet light diffuser and a discreet light collimator into the same backlight liquid crystal display.

Active matrix liquid crystal display manufacturers have continued to make advances in improving the transmission of light valve, i.e., transmissive liquid crystal, displays. State-of-the-art active matrix liquid crystal, or light valve displays in VGA format, boast of transmission values that are slightly greater than four percent. This is good for a liquid crystal display, but still a very low transmittance. Larger, higher pixel density panels put an even greater burden on the backlight to generate more light for less power.

State-of-the-art backlight displays typically use what is called a light-pipe backlight assembly as illustrated in FIG. 2. This light-pipe backlight assembly is used in the majority of current liquid crystal displays. The assembly consists of one or more small diameter fluorescent lamps 29, set on the edge 22 of a clear sheet of plastic or UV friendly resin 23 (a light-pipe). A matte white reflector 31, which could be a paper-thin sheet of white plastic on the back side of the light-pipe 23, reflects the light out of the front 19. A reflector material 33, matte white or specular, is wrapped around the fluorescent lamp 29. The intent is to direct all the light from the lamp into the light-pipe 23. Typically, the fluorescent lamp 29 contains a glass envelope 25 with a phosphor coating 27 on the inside and Argon fill gas with a small amount of mercury as the source of ultra violet radiation.

These light-pipe backlight assemblies typically utilize brightness enhancements films 37 and diffusers 35 to increase and evenly space the luminance at the front of the display. These films 37 and diffusers 35 accomplish their intended function at the expense of viewing angle. The selection of polarizing materials, color filter materials, construction of the row and column traces, and the thin film transistors resident at each subpixel, impose a fundamental limit on how much light can be allowed through a panel. Currently, 10.4" diagonal notebook computer displays are limited to a luminance of about 20 foot Lamberts. If larger displays are used, battery power consumption increases significantly. For example, the time between battery charges for a 12.1 inch diagonal display is an average one-third less than the time between battery charges for a 10.4 inch diagonal display. As a result, active matrix liquid crystal display manufacturers have been constantly searching for a better and more efficient backlight assembly.

The ideal light-pipe backlight assembly would take all the light generated in the fluorescent lamp 29 and spread it evenly over the surface of the light-pipe 23 with no losses. Unfortunately, the current state-of-the-art falls considerably short of the ideal.

The expected light output of such an ideal backlight assembly can be determined. Since luminance is dependent on the total light energy (flux density) contained in the unit solid angle determined by the area of the spot and distance from the input aperture, the luminance will be the same (within the limits of manufacturing capabilities) for any area location on the lamp. Surface luminance values of 17,000 foot Lamberts (58,242 nits is the metric equivalent) are typical for the lamps 29 currently used. The length and diameter of the lamp 29 determine the total emissive flux and the x and y dimensions of the light-pipe 23 determine the total emissive surface over which the flux is to be spread.

The lateral surface area of the lamp 29, which is a cylinder, is then calculated to be $2\pi$ rl in square feet, where "r" is the radius of the lamp and "l" is the length of the lamp. The area of the light-pipe 23 (x≠y) in square feet is calculated. The ratio of lamp emissive area to the light-pipe area and the expected light output of the backlight assembly are then calculated as to be described. For example, for a lamp that measures 0.120 inches (3 mm) in diameter and 8.0 inches (183 mm) in length, using the equation above, the lateral surface area is 2.714 square inches. Dividing this by 144 to convert to square feet results in 0.0188 square feet. Assuming the dimensions of the light-pipe are 6 inches by 8 inches, its area is 48 square inches, or 0.333 square feet. The ratio of the emissive areas, the lamp area to the light-pipe area, is then 0.0188/0.3333, or 0.0564.

The emissive area ratios (0.0564) times the luminance of the lamp in foot Lamberts (17,000) equals 960 foot Lamberts, which represents the potential luminance that one would expect to find at any point on the light-pipe backlight assembly 23.

To obtain the actual light output from the backlight assembly illustrated in FIG. 2, the surface luminance is measured with a spot photometer. During testing, the measured luminance from a typical backlight assembly configured as in the example above was only 320 foot Lamberts. Consequently, two-thirds of the potential light output was lost somewhere in the assembly.

The light-pipe 23 itself is not lossy in terms of its ability to distribute and reflect light energy evenly over its working surface. It consists of a thin clear plastic substrate (sometimes wedge shaped for better distribution patterns) coupled with an opaque matte white reflector.

Very little or no losses can be attributed to the lamp 29. The lamp 29, commonly referred to as a pencil tube, is an efficient producer of light energy. It is a fluorescent lamp that uses ultra-violet photon bombardment of photo-luminescent phosphors to generate the visible light energy. The source of the ultra-violet (UV) is a small amount of mercury inside the tube. The loss of light energy in the assembly occurs at the interface of the lamp 29 and the light-pipe 23. The flat edge 22 of the light-pipe 23 is essentially an optical blank. It has a very different index of refraction (1.51 typically) than air (1.00) making it an unfriendly interface.

SUMMARY OF THE INVENTION

An object of this invention is to provide a backlight assembly for light valve displays that provide more light for less power without the attendant viewing angle and battery life disadvantages prevalent in the prior art.

This object and the general purpose of this invention are accomplished by providing a clear resin molded sheet with at least one cavity along one of its edges. The inside walls of the cavity are coated with a photo-luminescent phosphor. A UV illuminator lamp is located inside the phosphor coated cavity. The index of refraction of the phosphor binder is matched to the resin sheet material. The light energy generated by the incident UV and the photo-luminescent phosphor is inside the resin sheet, thereby eliminating coupling losses.

BRIEF DESCRIPTION OF THE DRAWINGS

The exact nature of this invention, as well as its objects and advantages, will become readily appreciated as the same becomes better understood by reference to the following details and description when considered in conjunction with the accompanying drawings, in which like reference numerals designate like parts throughout the figures thereof, and wherein:

FIG. 3 is a front view of a light-pipe backlight assembly according to the present invention;

FIG. 4 is a side view of the backlight assembly shown in FIG. 3; and

DESCRIPTION OF THE PREFERRED EMBODIMENTS

Figure 5:
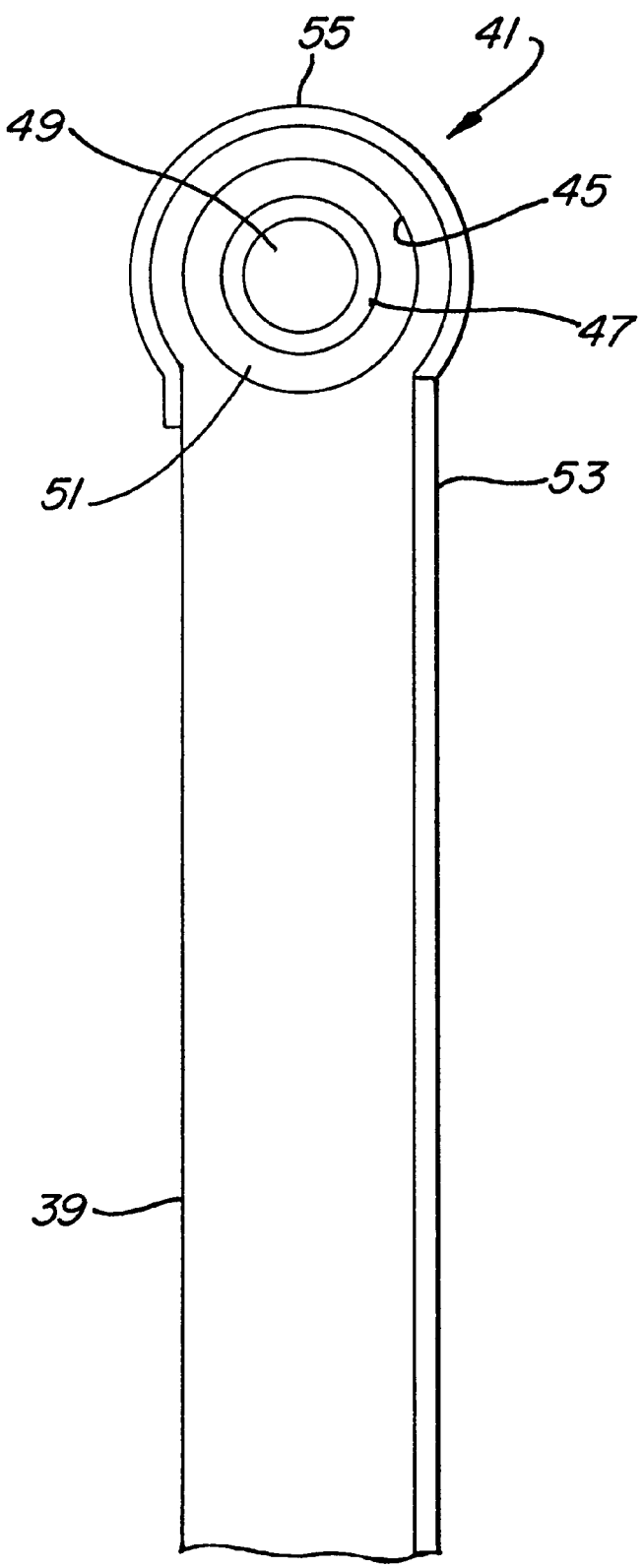
FIG. 5 is a cross-sectional view of the backlight assembly of FIG. 3 taken along sectional lines 5—5.

FIGS. 3, 4 and 5 illustrate the unique solution of the present invention to the two-thirds light output loss between the lamp and the light-pipe of the prior art. The solution is to create light energy inside the light-pipe itself. An ultraviolet (UV) friendly resin is utilized to mold a light-pipe 39 which has rounded ends 41 and 43. The UV friendly resin, for example, could be a clear plastic or UV friendly resin. Inside the rounded end 41, a circular cavity 51 extends the length of one side of the light-pipe 39. The inside of the cavity 51 is lined with a photo-luminescent phosphor coating 45 having a binder material with an index of refraction that is closely matched to the UV friendly resin of the light-pipe 39. A lamp 49 is suspended inside the cavity 51. An envelope 47 of the lamp 49 is preferably made of an Ozone-free quartz material such as titanium doped silicon dioxide, for example. A small amount of titanium dopant may be added to the quartz material to suppress the 186 nm mercury line and pass the 254 nm mercury line. As is known, the 254 nm mercury line is the principle excitation wavelength of photo-luminescent phosphor. The envelope 47 of the lamp is preferably 3 mm in diameter and uses an Argon fill gas at a pressure of about 90 torr.

The lamp 49 serves as the UV photon engine which generates the UV that bombard the photo-luminescent phosphor coating 45 of the cavity 51. By locating the phosphor coating outside the lamp envelope 47, the phosphor coating does not suffer degradation caused by light at a wavelength of 186 nanometers, nor does it come in contact with the cathode located inside the lamp, thereby considerably useable increasing the lamp life.

The cathode is a standard cold cathode used in pencil tube lamps readily available today. One surface of the light-pipe 39 is outfitted with a matte white reflector 53. The ends 41 of the light-pipe 39 containing the lamp 49 therein is also covered with a reflector material 55, as is well known in the art.

Figure 1:
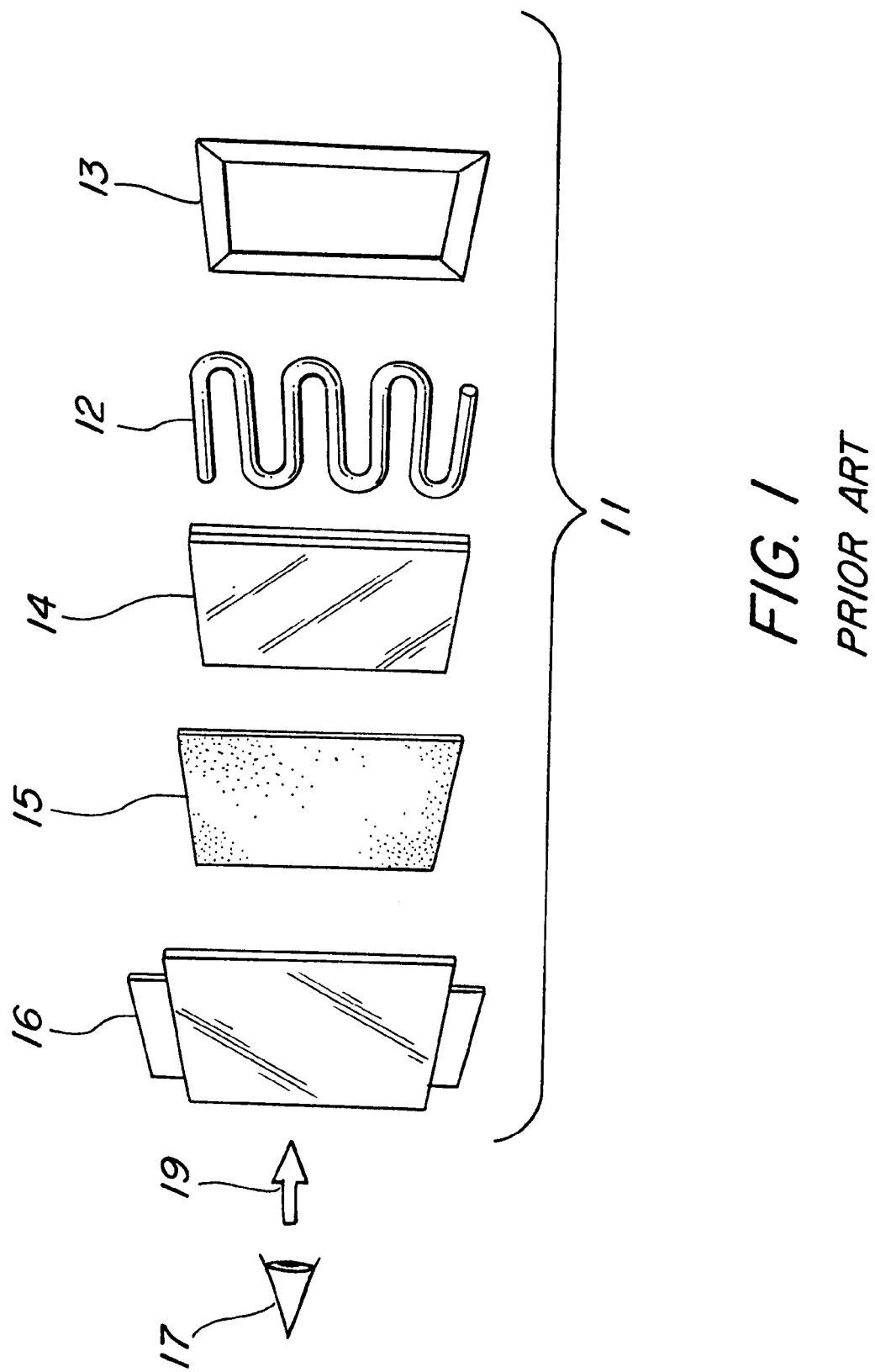
FIG. 1 is an exploded perspective view of a standard active liquid crystal display assembly.
Figure 2:
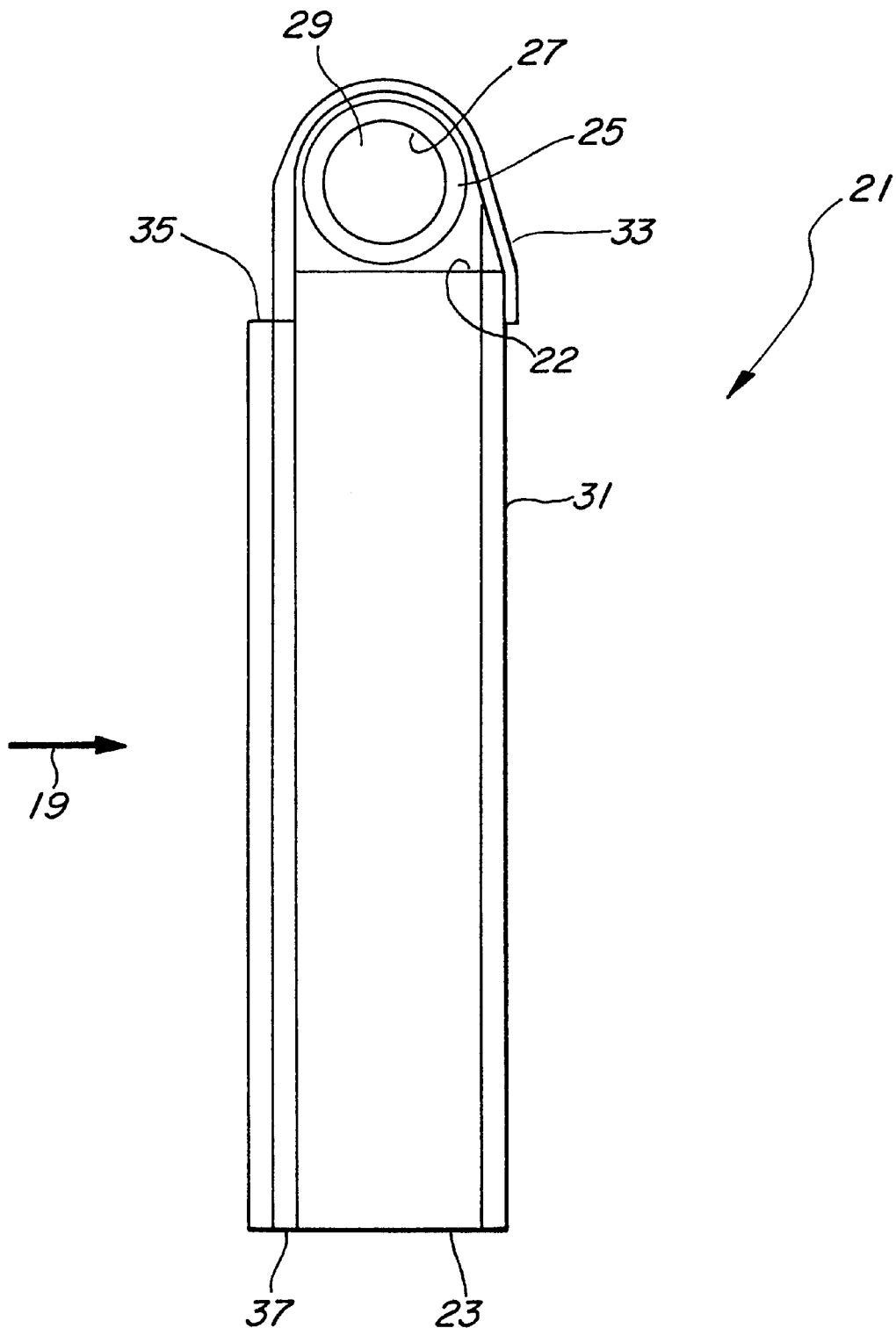
FIG. 2 is a cross-sectional side view of a light-pipe backlight assembly typically used in an active liquid crystal display.

By integrating a circular cavity 51 into the body of the light-pipe 39, a clean optical interface is created. Coating the cavity 51 with the photo-luminescent phosphor material all but eliminates coupling losses between the visible light from the phosphor in the center of the cavity 51 and the light-pipe 39. One advantage then of the structure shown in FIGS. 3, 4 and 5 is that the coupling losses encountered in a conventional light-pipe, such as shown in FIG. 2, are drastically reduced, thereby greatly increasing luminescence without an increase in power draw. If even greater luminescence is required, another lamp may be disposed at the opposite end 43 of the light-pipe 39.

This particular construction of a light-pipe also permits the use of all the other elements of a conventional backlight assembly such as reflectors, brightness enhancement films, inverters, and the like, as desired.

Having thus described the invention in detail by way of reference to preferred embodiments thereof, it will be apparent that other modifications and variations are possible without departing from the scope of the invention defined in the appended claims. Therefore, the spirit and scope of the appended claims should not be limited to the description of the preferred versions contained herein.

What is claimed is:

1. A backlight for electronic displays, comprising:
    a light-pipe molded from a resin sheet having a cavity therein at one end of the light-pipe;
    a fluorescent lining on the inside walls of the cavity; and
    an ultra violet source inside the cavity for exciting the lining to fluoresce and generate fluorescent light energy substantially throughout the light-pipe.

2. The backlight of claim 1 further comprising a reflector coating on one face and the one end of the light-pipe, whereby light energy exits the light-pipe from only one surface.

3. The backlight of claim 2 wherein the reflector coating is matte white.

4. The backlight of claim 3 wherein the fluorescent lining has an index of refraction close to the index of refraction of the light-pipe.

5. The backlight of claim 1 wherein the fluorescent lining has an index of refraction approximately equal to the index of refraction of the light-pipe.

6. The backlight of claim 4 wherein the ultra violet source comprises a quartz lamp.

7. The backlight of claim 1 wherein the ultra violet source comprises a quartz lamp approximately the length of the cavity in said light-pipe.

8. The backlight of claim 7 wherein the quartz lamp generates mercury plasma in an Argon gas.

9. The backlight of claim 1 wherein the resin sheet of the light-pipe is highly immune to ultra violet energy.

10. The backlight of claim 1 wherein the fluorescent lining is a photo-luminescent phosphor.

11. The backlight of claim 9 wherein the quartz lamp generates mercury plasma in an Argon gas.

12. The backlight of claim 10 wherein the resign sheet of the light-pipe is highly immune to ultra violet energy.

13. The backlight of claim 9 wherein the fluorescent lining is a photo-luminescent phosphor.

14. A backlight for light valve displays, comprising:
    a light-pipe molded from a clear resin sheet having a plurality of cavities therein, each cavity aligned with a different end of the light-pipe;
    a fluorescent lining on the inside walls of each cavity; and
    an ultra violet source inside each cavity for exciting the fluorescent lining to fluoresce and generate fluorescent light energy substantially throughout the light-pipe.

15. The backlight of claim 14 further comprising a reflector coating on one face and the ends of the light-pipe nearest the cavities, whereby light energy exits the light-pipe only from one surface.

16. The backlight of claim 15 wherein the reflector coating is matte white.

17. The backlight of claim 14 wherein the fluorescent lining has an index of refraction matched to be close to the index of refraction of the light-pipe.

18. The backlight of claim 14 wherein the ultra violet source comprises a quartz lamp.

19. The backlight of claim 18 wherein the quartz lamp generates mercury plasma in an Argon gas.

20. The backlight of claim 14 wherein the resin sheet of the light-pipe is highly immune to ultra violet energy.

21. The backlight of claim 14 wherein the fluorescent lining is photo-luminescent phosphor.

* * * * *